(No Model.)

U. B. WATKINS.
CORN SHOCK TYER.

No. 377,182. Patented Jan. 31, 1888.

WITNESSES:
J. D. Garfield
C. Sedgwick

INVENTOR:
U. B. Watkins
BY Munn & Co.
ATTORNEYS.

UNITED STATES PATENT OFFICE.

URIAH B. WATKINS, OF BARCLAY, KANSAS.

CORN-SHOCK TYER.

SPECIFICATION forming part of Letters Patent No. 377,182, dated January 31, 1888.

Application filed May 5, 1887. Serial No. 237,211. (No model.)

*To all whom it may concern:*

Be it known that I, URIAH BALDWIN WATKINS, of Barclay, in the county of Osage and State of Kansas, have invented a new and Improved Corn-Shock Tyer, of which the following is a full, clear, and exact description.

My invention relates to a device for tying shocks of corn or other grain to protect them from storms and maintain their freshness for use as fodder; and the invention has for its object to provide a simple, inexpensive, and efficient instrument of this character, allowing the shocks to be tied securely by one person, and with economy of time and labor.

The invention consists in certain novel features of construction and combinations of parts of the shock-tyer, all as hereinafter described and claimed.

Reference is to be had to the accompanying drawings, forming a part of this specification, in which similar letters of reference indicate corresponding parts in both the figures.

Figure 1:
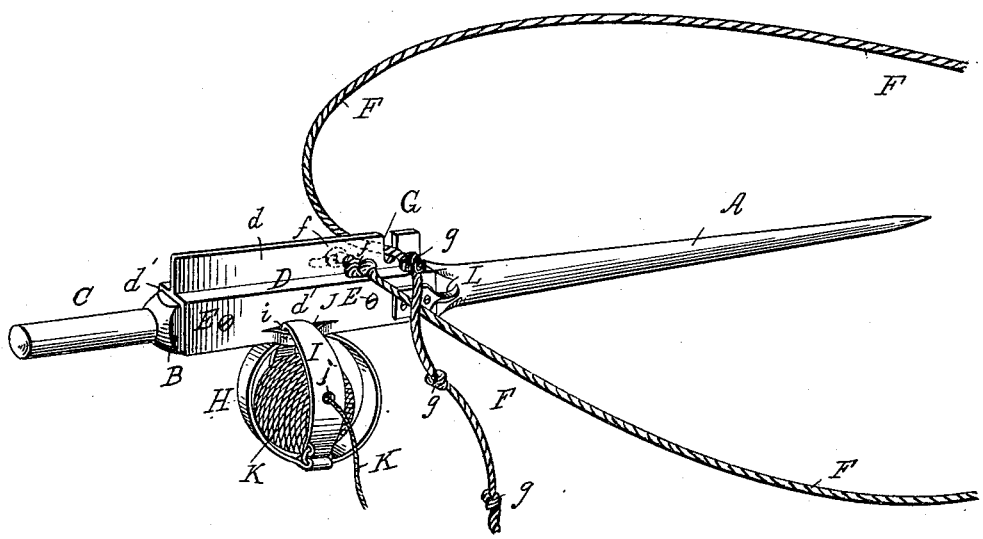
Figure 2:
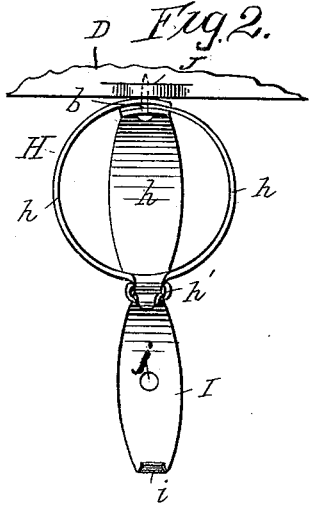

Figure 1 is a perspective view of my improved corn-shock tyer with the tightening-cord broken away, and Fig. 2 is a detail view of the twine-holder (shown open) and a part of the pin to which it is attached.

The corn-shock tyer is made with a pin about two feet long and formed with a sharpened forward end or pin, A, adapted to enter the shock to be tied, a shank or body portion, B, and a handle, C.

To the shank B a metal stock or flanged plate, D, is fixed preferably by screws or bolts E, passed through the opposite sides $d'$ $d'$ of the plate and through the shank, and whereby a flange, $d$, fixed to the top of the plate, is held securely to the device. A tightener consisting, preferably, of a cord, F, is held to the device preferably by passing one end of the cord through a hole in the flange $d$ of the plate D and knotting the cord at $ff$ at each side of the flange. The cord is provided at or near its free end with a series of knots, $g$, forming stop-lugs, which may catch against the side or face of the flange $d$ when the cord is slipped into a notch or slot, G, made in the flange.

A twine-holding box, H, is fixed to the shank B of the tyer, and is made, preferably, from a piece of sheet metal cut to form three bars or plates, $h$, which are bent around upward and are fastened at the ends by a screw, $b$, to the shank B, and the fourth side of the box consists of a half-round plate, I, which is hinged at $h'$ to the lower point of junction of the plates $h$, and has a hook end, $i$, adapted to catch or lock into a slot or notch, J, in the side of the shank-plate D, or it may be into an eye fixed to the shank. The lid or cover-plate I of the twine-box has a hole, $j$, through which the loose end of the twine K passes from a ball of it placed in the box. A knife, L, fixed to the pin A or its plate D, about at the point of junction of the pin with the shank of the device, allows cutting of the twine after the shock has been tied.

The operation of the tyer is as follows: The device will be grasped by the left hand by its handle C, and will be thrust at proper height into the corn-shock to be tied. The loose or free ends of the tightening-cord F and tying-twine K will be grasped and carried around the shock by the operator who walks around the shock for this purpose, and while the handle C of the tyer is firmly grasped by the left hand the cord F, which had been passed at its knotted end above or over the flange D, will be drawn up by pulling on it with the right hand, and when it is fully tightened on the shock the cord will be slipped into the notch G of the plate D, to securely hold the tightener and the shock bound thereby by any one of the knots $g$ on the cord, and then the twine K, which had been passed below the pin of the device, will be tied around the shock as close as may be to the knife L, to avoid waste of the twine, and when the knot is complete the twine will be cut off by passing it over or against the knife, and the tightening-cord F will then be released and thrown over forward, and the device is then ready for use in tying the next shock of corn or other grain, in the manner above described.

By providing a twine box or receptacle on the device the tying-twine and the tightener may be conveniently carried around the shock at the same time, thereby allowing the tying of the shocks by one man or a boy without inconvenience, and this feature, combined with the advantages afforded by the simple method of holding the tightening-cord by slipping it into the slot G, allows the work to be done well with economy of time and labor.

Having thus described my invention, what I claim as new, and desire to secure by Letters Patent, is—

1. The combination, in a shock-tyer, of a pin, A, having a shank and handle, a plate, D, having a flange, d, provided with a slot, G, and fixed to the shank, and a cord, F, secured at one end to the plate D and provided at its free end with a series of knots, g, substantially as described, for the purposes set forth.

2. The combination, in a shock-tyer, of a pin, A, having a shank and handle, a plate, D, having a flange, d, provided with a slot, G, and fixed to the shank, and provided, also, with a slot, J, forming an eye on the plate, a cord, F, secured at one end to the plate D and provided at its free end with a series of knots, g, and a twine-box held to the pin-shank and having a hinged lid, I, provided with a hook, i, adapted to the slot J in plate D, substantially as described, for the purposes set forth.

URIAH B. WATKINS.

Witnesses:
T. M. GRUWELL,
R. C. HEIZER.